US009882803B2

(12) United States Patent
Xie et al.

(10) Patent No.: US 9,882,803 B2
(45) Date of Patent: Jan. 30, 2018

(54) METHOD AND SYSTEM FOR IMPLEMENTING LOCAL IP SERVICE

(71) Applicant: ZTE Corporation, Shenzhen, Guangdong (CN)

(72) Inventors: Feng Xie, Shenzhen (CN); Feng Liang, Shenzhen (CN); Ying Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 1 day.

(21) Appl. No.: 14/380,429

(22) PCT Filed: Dec. 17, 2012

(86) PCT No.: PCT/CN2012/086775
§ 371 (c)(1),
(2) Date: Aug. 22, 2014

(87) PCT Pub. No.: WO2013/123802
PCT Pub. Date: Aug. 29, 2013

(65) Prior Publication Data
US 2015/0010010 A1 Jan. 8, 2015

(30) Foreign Application Priority Data

Feb. 22, 2012 (CN) .......................... 2012 1 0040993

(51) Int. Cl.
*H04W 80/04* (2009.01)
*H04L 12/715* (2013.01)
(Continued)

(52) U.S. Cl.
CPC .............. *H04L 45/04* (2013.01); *H04L 69/08* (2013.01); *H04W 76/022* (2013.01);
(Continued)

(58) Field of Classification Search
CPC ... H04W 36/02; H04W 40/00; H04W 36/023; H04W 76/025; H04W 72/04;
(Continued)

(56) References Cited

U.S. PATENT DOCUMENTS

2010/0278108 A1 11/2010 Cho
2011/0045826 A1 2/2011 Kim
(Continued)

FOREIGN PATENT DOCUMENTS

CN 101860976 A 10/2010
CN 101895986 A 11/2010
(Continued)

OTHER PUBLICATIONS

Supplementary European Search Report in European application No. 12869312.4, dated Oct. 13, 2015.
(Continued)

*Primary Examiner* — Jae Y Lee
*Assistant Examiner* — Aixa Guadelupe-Cruz
(74) *Attorney, Agent, or Firm* — Oppedahl Patent Law Firm LLC

(57) ABSTRACT

The present disclosure provides a method and system for implementing a local IP service through a relay node, through which a PDN connection between a local UE and a local gateway is established, and local IP service data are transmitted through the relay node between the UE and the local gateway. In the present disclosure, a local gateway is embedded into a relay node, or the local gateway is collocated with the relay node, or the local gateway is connected to the relay node via a wired connection, and a PDN connection between a local UE and the local gateway is established through the relay node. The present disclosure can support not only a local service or a proximity-based service between a relay node and a UE but also a local
(Continued)

service or a proximity-based service between two or more UEs through a relay node, thus supporting extensive applications based on local IP data streams and reducing the load of a core network. In addition, spectral efficiency and throughput can also be improved by using a short distance wireless channel.

18 Claims, 11 Drawing Sheets

(51) Int. Cl.
　　　H04W 76/02　　(2009.01)
　　　H04L 29/06　　(2006.01)
　　　H04W 92/02　　(2009.01)
　　　H04W 80/00　　(2009.01)
　　　H04W 84/04　　(2009.01)
　　　H04W 28/08　　(2009.01)
　　　H04W 88/04　　(2009.01)
　　　H04W 88/16　　(2009.01)
　　　H04W 92/04　　(2009.01)
(52) U.S. Cl.
　　　CPC ......... *H04W 76/023* (2013.01); *H04W 92/02* (2013.01); *H04W 28/08* (2013.01); *H04W 80/00* (2013.01); *H04W 80/04* (2013.01); *H04W 84/042* (2013.01); *H04W 84/047* (2013.01); *H04W 88/04* (2013.01); *H04W 88/16* (2013.01); *H04W 92/04* (2013.01)
(58) Field of Classification Search
　　　CPC .... H04W 40/04; H04L 12/715; H04L 67/289; H04L 67/2842
　　　See application file for complete search history.

(56) References Cited

U.S. PATENT DOCUMENTS

| | | | |
|---|---|---|---|
| 2011/0310799 A1* | 12/2011 | Horn | H04W 76/02 370/328 |
| 2012/0071168 A1* | 3/2012 | Tomici | H04W 76/025 455/445 |
| 2013/0188598 A1* | 7/2013 | Zakrzewski | H04W 36/023 370/331 |

FOREIGN PATENT DOCUMENTS

| | | | | |
|---|---|---|---|---|
| CN | 101932074 | A | 12/2010 | |
| CN | 101998365 | A | 3/2011 | |
| CN | 101998449 | A | 3/2011 | |
| CN | 101998554 | A | 3/2011 | |
| CN | 102026293 | A | 4/2011 | |
| CN | 102056141 | A | 5/2011 | |
| CN | 102077525 | A | 5/2011 | |
| CN | 102104980 | A | 6/2011 | |
| CN | 102111748 | A | 6/2011 | |
| CN | 102131251 | A | 7/2011 | |
| CN | 102196403 | A | 9/2011 | |
| CN | WO 2013116981 | A1 * | 8/2013 | ............ H04W 16/26 |
| EP | 2147541 | A2 | 1/2010 | |
| WO | 2009132139 | A1 | 10/2009 | |
| WO | 2010119707 | A1 | 10/2010 | |
| WO | 2010121421 | A1 | 10/2010 | |
| WO | 2010122511 | A1 | 10/2010 | |
| WO | 2010123643 | A1 | 10/2010 | |
| WO | 2010126326 | A2 | 11/2010 | |
| WO | 2010129930 | A2 | 11/2010 | |
| WO | 2011006404 | A1 | 1/2011 | |
| WO | 2011023043 | A1 | 3/2011 | |
| WO | 2011035732 | A1 | 3/2011 | |
| WO | 2011050663 | A1 | 5/2011 | |
| WO | 2011053039 | A2 | 5/2011 | |

OTHER PUBLICATIONS

International Search Report in international application No. PCT/CN2012/086775, dated Mar. 28, 2013. (2 pages—see entire document).

English Translation of the Written Opinion of the International Search Authority in international application No. PCT/CN2012/086775, dated Mar. 28, 2013. (6 pages—see entire document).

* cited by examiner

METHOD AND SYSTEM FOR IMPLEMENTING LOCAL IP SERVICE

TECHNICAL FIELD

The present disclosure relates to the field of wireless communication techniques, and in particular to a method and system for implementing a local Internet Protocol (IP) service.

BACKGROUND

In a wireless cellular communication system, a base station is an equipment for providing a User Equipment (UE, also referred to as a terminal) with wireless access, and the base station communicates wirelessly with the UE through electromagnetic waves. One base station may include one or more serving cells, and a wireless communication system can provide wireless coverage for terminals within a certain geographical region through serving cells.

In order to provide users with wireless communications in a large region, a wireless communication system is desired to deploy a base station covering a large region, this kind of station is often referred to as a Macro eNB or Macro Base Station (Macro BS), and its serving cell is often referred to as a Macro Cell. In addition, in consideration of different demands from users and different usage environments, a wireless communication system is desired to provide a user with wireless communication services having higher quality in certain environments or scenarios, thus some small-scale base station having small coverage and low transmission powers are used. These small-scale base stations include a Pico eNB or Pico BS and a Home Node B or Home eNodeB (HNB or HeNB, also referred to as Femto eNB or Femto BS). Besides same remote IP services (services supported by a core network of an operator, which are supported by a Packet Data Network Gateway (PDN-GW) located in the core network of the operator) as supported by a Macro BS, an HNB can further support local IP services (IP services supported by a local area network such as a home network and an enterprise network, which are supported by a Local Gateways (L-GW)). However, an H(e)NB requires a wired backhaul (e.g., a network connected to an operator through an optical fiber, a cable and the like), thus the H(e)NB can not be moved freely, and the HNB may generate great interferences on an adjacent Marco cell, this further limits deployment scenarios of an H(e)NB, and thus limits application scenarios for providing a local IP service using an H(e)NB.

SUMMARY

In view of the above, the present disclosure provides a method and system for implementing a local IP service so as to implement a local IP service through a relay node.

To this end, the present disclosure is implemented as follows.

A method for implementing a local IP service through a relay node, including:

a Packet Data Network (PDN) connection between a local User Equipment (UE) and a local gateway is established via the relay node, and local IP service data between the UE and the local gateway are transmitted through the relay node.

Wherein the local gateway is embedded into the relay node, or the local gateway is collocated with the relay node, or the local gateway is connected to the relay node via a wired connection.

Wherein the local gateway includes a local cache and/or a local server; or the local gateway is connected with at least one of the following network element and networks: a local server, a local area network and an Internet.

Wherein the method further includes:

network load conditions are indicated by a Donor eNodeB (DeNB) to the relay node and/or the local gateway, the local IP service is cached locally by the local gateway during a low network load period, and/or the local gateway caches locally while the relay node provides the local UE with relay services.

Wherein the step of caching locally by the local gateway while the relay node provides the local UE with relay services includes:

after data arrive at the relay node from the DeNB, besides sending the data to the UE through a Uu interface between the relay node and the UE, the relay node copies the data for the local gateway so as to be cached locally; or the data arrive firstly at the local gateway from a Packet Data Network Gateway (PDN-GW) of a core network, then arrive at a UE served by the relay node from the local gateway.

Wherein the relay node comprises at least one of a type 1 relay node, type 1A relay node, type 1B relay node and type 2 relay node.

Wherein an S5 interface is supported between the local gateway and a Serving Gateway (S-GW) of a core network.

Wherein S5 interface data between the local gateway and the S-GW of the core network are transmitted through the relay node and the DeNB.

Wherein the method further includes:

a Mobility Management Entity (MME) of a core network controls the establishment of the PDN connection between the UE and the local gateway.

Wherein PDN connections between two or more local UEs and the local gateway are established through the relay node;

End-to-end IP service streams through the local gateway are established between the two or more local UEs.

Wherein the method further includes:

a PDN connection between a UE and a Packet Data Network Gateway (PDN-GW) of a core network is established through the relay node, and remote IP service data between the UE and the PDN-GW of the core network are transmitted via the relay node.

Wherein the method further includes:

an MME of the core network and a base station controls mutual switching between the following two modes: a PDN connection mode between the UE and the local gateway, and a PDN connection mode between the UE and the PDN-GW of the core network.

Wherein the method further includes:

the UE is connected simultaneously with IP data PDN connections to a plurality of gateways, wherein the PDN connection between the UE and the local gateway and the PDN connection between the UE and the PDN-GW of the core network are included.

Wherein the method further includes:

an MME of the core network and a base station controls mutual switching between a local IP service mode based on the local gateway and an inter-UE direct communication mode.

A system supporting local IP service functionality includes a relay node, a base station and a Mobility Management Entity (MME), wherein the relay node includes:

a relay functional module configured to provide a UE with data relay services;

a local IP functional module configured to provide a UE with local IP access functionality; and the MME and the base station are configured to manage and control the relay node.

Wherein for a UE, only the relay functional module provides the UE with data relay services, or only the local IP functional module provides the UE with local IP access functionality, or the relay functional module and the local IP functional module provide the UE with services simultaneously.

Wherein a relay mode of relay services provided by the relay functional module and a local IP access mode of local IP access functionality provided by the local IP functional module are switched mutually therebetween.

Wherein the local IP functional module is further configured to implement mutual switching between a local IP service mode based on the local gateway and an inter-UE direct communication mode under the control of the MME and the base station.

In the present disclosure, a local gateway is embedded into a relay node, or the local gateway is collocated with the relay node, or the local gateway is connected to the relay node via a wired connection, and a PDN connection between a local UE and the local gateway is established through the relay node. The present disclosure can support not only a local service or a proximity-based service between a relay node and a UE but also a local service or a proximity-based service between two or more UEs through a relay node, thus supporting extensive applications based on local IP data streams and reducing the load of a core network. In addition, spectral efficiency and throughput can also be improved by using a short distance wireless channel.

DETAILED DESCRIPTION

Figure 1:
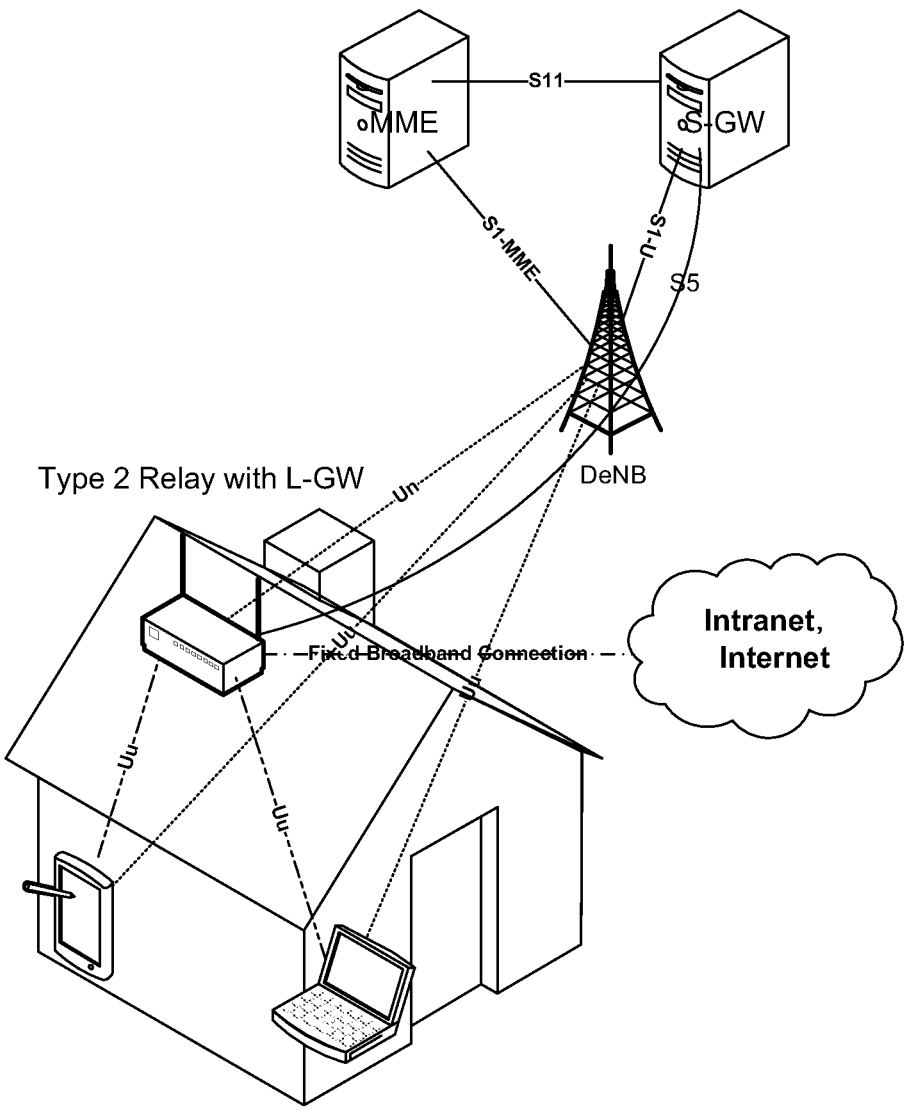
FIG. 1 is an architectural diagram when a type 2 relay system supporting a local IP service supports a local IP service.

In order to make objectives, technical solutions and advantages of the present disclosure more clear, the present disclosure will be further elaborated below in combination with the accompanying drawings and embodiments.

A Relay Node (RN) can provide transmission relay services between a base station and a UE, wherein a link between the base station and the relay node is referred to as a backhaul link, a corresponding air interface is referred to as a Un interface, and a link between the relay node and the UE is referred to as an access link. A relay node can be used to increase coverage of a base station, and provides a series of applications such as a hotspot service within a moving compartment and a cabin. There are two types of relay nodes based on their physical layer characteristics, i.e., an extended Type 1 relay nodes having independent cell identifiers (the extended Type 1 relay nodes are namely relay nodes having independent cell identifiers), and type 2 relay nodes having no independent cell identifiers, wherein the extended Type 1 relay nodes having independent cell identifiers are further divided into three types of relay nodes, i.e., type 1 relay node, type 1A relay node and type 1B relay node, specifically, a backhaul link and an access link of the type 1 relay node have a same carrier frequency (this kind of relay is also referred to as an inband relay) and the two links operates alternately in a time division manner, a backhaul link and an access link of a type 1A relay node have different carrier frequencies (this kind of relay is also referred to as an out-band relay), and a backhaul link and an access link of a type 1B relay node have a same carrier frequency (also being an in-band relay) and the two links have enough antenna isolation thus may operate simultaneously.

A relay node per se is used to perform data transmission relay services between a base station and a UE, and can not support a direct IP data service between the UE and the relay node. In certain scenarios, a user may need local services (such as local social networks, games, advertisements and the like), or a communication service between devices within adjacent geographical regions, which is often referred to as a proximity-based service or a device-to-device (D2D) service, and needs IP service streams to be established between local devices or between adjacent devices. In addition, relay nodes are also used in vehicles such as a train (high-speed train), a plane and a car, where they are also referred to as mobile relay nodes, passengers on these vehicles often would like to watch programs such as movies, videos and the like on their travel, and if files of these programs are placed on the vehicles and can be accessed by users through a relay node, bandwidths of a backhaul network (especially Un air interfaces) can be saved and spectral efficiencies can be improved, furthermore, bandwidths on an access link can be used to provide users with rates fast enough to access multimedia resources (thus avoiding accessing through a Un interface which may be a bottle neck), thereby providing users with good service experiences. To obtain these services, a UE is desired to be capable of establishing IP service streams with a relay node, in other words, the relay node doesn't merely function as a relay, instead it function as something like a Home eNode B (HeNB) supporting a local IP service, but it has apparent advantages compared to an HeNB, i.e., unlike the HeNB, the relay node doesn't need a wired backhaul, and (as a node cooperating with a Marco cell) avoids a problem that an HeNB may generate severe interferences on the Marco cell, and cooperation between a Marco eNB and the relay node can obtain higher spectral efficiencies (a partition rate of resources between a Marco eNB and a relay node can be adjusted flexibly) so that its deployment is more flexible and more efficient.

On this account, the present disclosure provides a system architecture supporting a local IP service using a relay node so as to support extensive applications based on local IP data streams and reduce the load of a core network, in addition, spectral efficiency and throughput can also be improved by using a short distance wireless channel.

Embodiment 1

A local IP service can support various applications in a local area, such as social networks, games, advertisements and multimedia applications (e.g., music, movie, video, e-book), and can also split load pressure on a core network. Besides supporting a local IP service, the architecture according to the present disclosure will not affect the support of a remote IP service. Specific system architectures, when the architecture according to the present disclosure supports a local IP service, a remote IP service and simultaneously supports both services, will be elaborated below with reference to FIG. 1, FIG. 2 and FIG. 3.

FIG. 1 is an architectural diagram when a type 2 relay system supporting a local IP service supports a local IP service.

As shown in FIG. 1, a type 2 relay node is deployed in a geographical region (e.g. in a room) providing a local service or a proximity-based service, a Un interface is supported between the relay node and a Donor eNodeB (DeNB), and a Uu interface is supported between the DeNB and ordinary UEs and between the relay node and the ordinary UEs.

In the embodiment, in order to support a local IP service, a Local Gateway (L-GW) is embedded into the relay node, or the relay node is collocated with the local gateway, or the relay node is connected to the local gateway via a wired connection. A system using such an architecture supports a local PDN connection between a UE and a local gateway via a relay node.

Since the type 2 relay node doesn't establish an independent cell, the DeNB is desired to manage the establishment, configuration and deletion of Data Radio Bearer (DRB) between the relay node and the ordinary UEs, and to allocate resources for transmission between the relay node and the ordinary UEs. Signalings between a DeNB and a UE can be transmitted through a relay node (a backhaul of the relay node supports control plane data and user plane data), and the signalings can also be transmitted directly between the DeNB and the UE (a backhaul of the relay node supports only user plane data) instead of being transmitted through the relay node.

The local gateway includes a local cache and/or a local server; or the local gateway is connected with at least one of network elements and networks such as a local server, a local area network or an Internet so as to provide content/ application services.

The local cache (and a local database, a local content providing device) can effectively reduce overhead of backhaul resources, for example, when a file is used by multiple UEs, backhaul resources are used only once by using a local cache rather than being used once when each UE downloads the file.

Preferably, the DeNB can indicate network load conditions to a relay node and/or a local gateway, the local gateway can cache locally during a low network load period to avoid a peak period of system loads and improve system efficiency. To this end, a local gateway and/or a relay node can trigger or stop local caching according to network load conditions, a content server of a core network can also push content to a relay node and/or a local gateway, and the pushing can be triggered or stopped according to network load conditions.

Preferably, a local gateway can cache locally while a relay node provides a local UE with relay services, specifically, after data arrive at a relay node from a DeNB, besides sending the data to the UE through a Uu interface between the relay node and the UE, the relay node copies the data for the local gateway as a local cache; or the data arrive firstly at the local gateway from a Packet Data Network Gateway (PDN-GW) of a core network (via a tunnel between the PDN and the LGW), then arrive at a UE served by the relay node from the local gateway (one implementation method is that a remote IP connection of a UE arrives at a local gateway from a PDN-GW of a core network then arrives at the UE, another implementation method is arriving at a UE via a local IP service connection between a local gateway and the UE), so as to reduce expense of backhaul resources and improve system efficiency.

Local IP data streams arrive at a local cache, a local server, a local area network or the Internet via a UE, a relay node and a local gateway, or vice versa. A relay node is responsible for mapping between a DRB and a local PDN connection.

An S1-MME (Mobility Management Entity) interface is supported between a DeNB and an MME of a core network, functions of the interface include: controlling a PDN connection between a UE and a local gateway passing through a relay node (including authorization, establishment, modification and release of the connection) and supporting paging of a UE; An S11 interface is supported between an MME and a Serving Gateway (S-GW), functions of the interface include: managing a session between a UE and a local gateway passing through a relay node (including establishment, modification and release of the session) and supporting caching data of the UE. An S5 interface is supported between a serving gateway and a local gateway, a function of the interface includes managing a session between a UE and a local gateway passing through a relay node (including establishment, modification and release of the session). S5 interface signalings and data between a serving gateway and a local gateway are transmitted through a DeNB.

A local IP service can have multiple service modes:

1) a local server broadcasts or pushes to one or more UEs, through a local gateway/relay node, a product catalog, advertisement information, discount information, map/traveling information, weather information, traffic information, live programs and/or location information, or one or more UEs (e.g., a portable computer, a tablet computer) access, through a relay node/local gateway, multimedia resources on a local server such as a movie file, a music file and the like, or interactive applications between a UE and a relay node/ between a local gateway and a local server, for example navigation, tour guiding, mobile payment and the like;

2) at least two UEs establish a connection with a local server through a relay node/local gateway, and the local server supports social network applications between at least two UEs, such as file sharing, chatting and/or games;

3) at least two UEs establish a direct connection with a local gateway through a relay node (the local gateway implements a local routing, also referred to as local switch or local forwarding, this mode can also be referred to as a local forwarding mode, which is suitable for not only a relay node+local gateway architecture but also various base stations (including an HeNB and a Pico BS)+local gateway architecture). Social network applications between at least two UEs are supported, such as file sharing, chatting and/or games (interactions between two UEs use a point-to-point mode while interactions between multiple UEs can use a multicast mode);

A proximity-based service or a device-to-device communication service refers to a service performing IP service transmission between two or more short-distance devices, however, if the transmission is directly performed between two or more UEs (referred to as a direct communication mode, generally, user data are transmitted directly between UEs and the control plane still passes through a base station and an MME), it may be difficult for the system to monitor and manage services between two UEs, and the communication range of the direct communication between two UEs may become short due to factors such as its low transmission power, little antenna gain and low antenna height (obscured easily by obstacles). Therefore, a better mode is to use a local IP service mode so as to facilitate an operator to monitor and manage (a relay node, a local gateway and even a local server are monitored and managed by an operator), and the communication through a relay node supports larger communication range (accordingly more users can use proximity-based services) since the relay node has a larger transmission power, a larger antenna gain and a higher antenna height. In this way, not only a local service or proximity-based service between a relay node and a UE can be supported, but also a local service or proximity-based service implemented by two or more UEs through a relay node can be supported. Preferably, switching can be made between a direct communication mode and a local IP service mode under the control of a core network MME and a base station, and an operator can determine whether a direct communication mode or a local IP service mode is used according to factors such as service type, UE identification, service region, network load and need for monitoring (e.g., a lawful interception).

Figure 2:
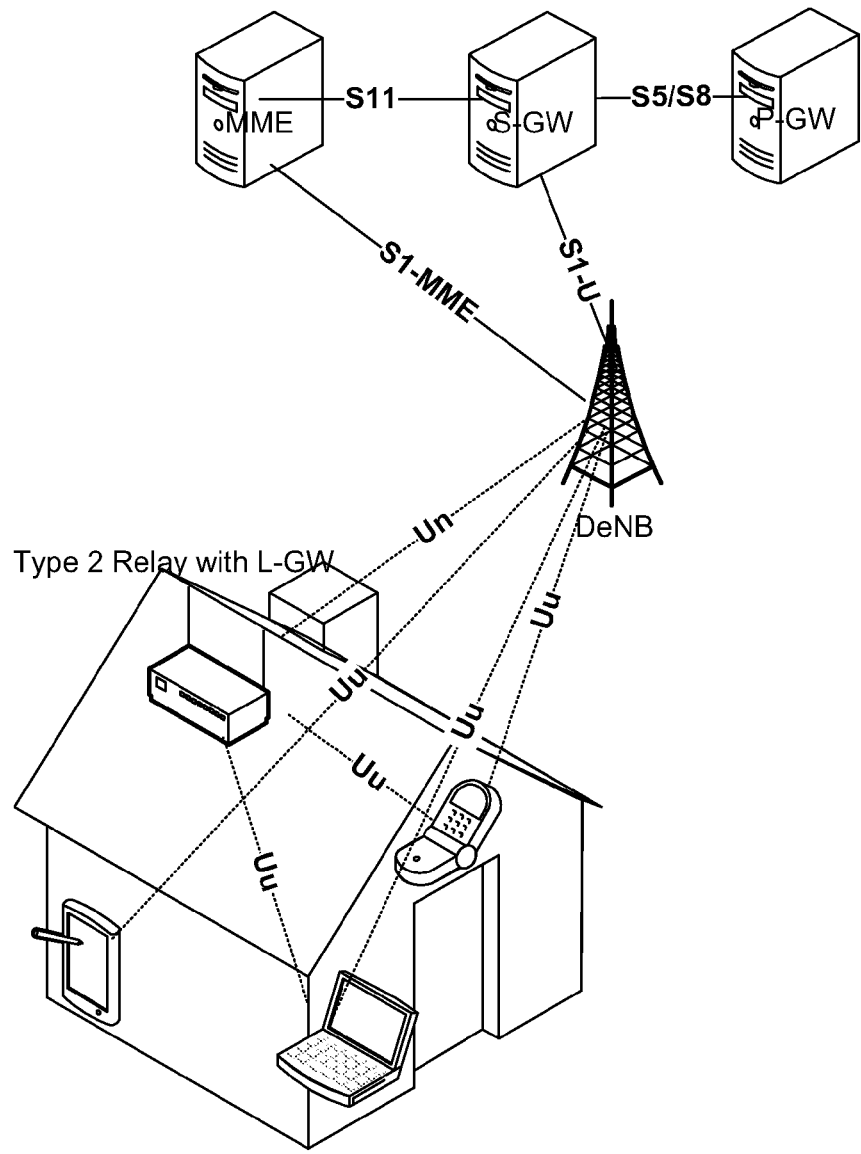
FIG. 2 is an architectural diagram when a type 2 relay system supporting a local IP service supports a non-local IP service.

FIG. 2 is an architectural diagram when a type 2 relay system supporting a local IP service supports a non-local IP service. As shown in FIG. 2, the difference between this architecture and the architecture in FIG. 1 lies in that a Data Radio Bearer (DRB) between a DeNB and an ordinary UE can choose whether to pass through the relay node or not (depending on factors such as channel conditions). If data transmission passes through a relay node, it is equivalent to the case that the data transmission is consisted of two segments, i.e., transmission between a DeNB and the relay node and transmission between the relay node and a UE. In a non-local IP service, a PDN connection between a UE and a Packet Data Gateway of a core network passes through a DeNB and an S-GW, and it can be referred to as a remote PDN connection (relative to a local PDN connection).

An S5 or S8 interface is supported between an S-GW and a PDN-GW (i.e., P-GW in the figure) of a core network, a function of the interface includes managing a session of a UE (including establishment, modification and release of the session).

Figure 3:
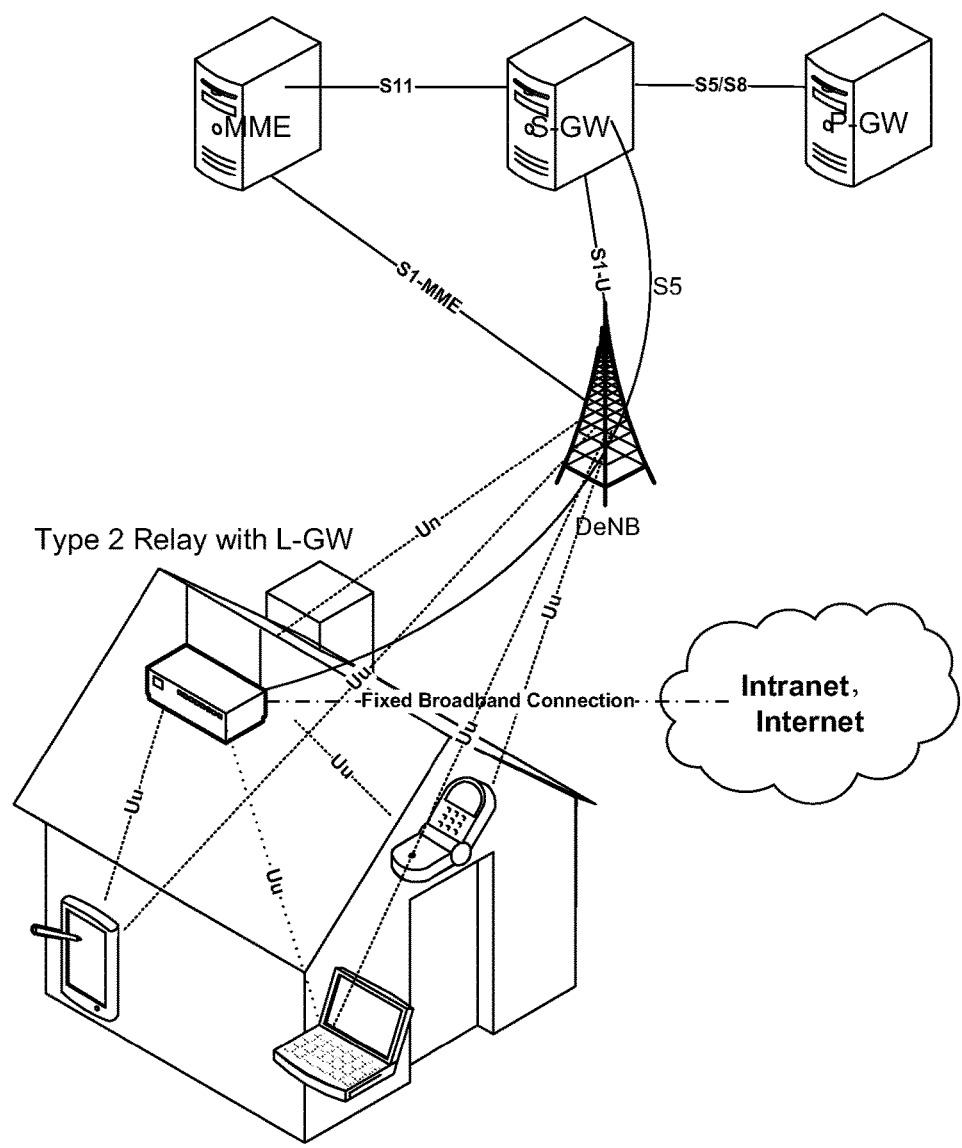
FIG. 3 is an architectural diagram when a type 2 relay system supporting a local IP service supports simultaneously a local IP service and a non-local IP service.

FIG. 3 is an architectural diagram when a type 2 relay system supporting a local IP service supports simultaneously a local IP service and a non-local IP service. In this architecture, a system can support local IP service connections and remote IP service connections of different UEs, it can also support simultaneous IP data connections between a UE and multiple gateways, including a local IP connection and a remote IP service connection, it can also support a switching between two IP service connections of a same UE, and it can also support simultaneous implementation of two IP service connections by a same UE.

Embodiment 2

On a high speed train, plane or automobile, passengers would like to watch programs such as movies, videos and the like or read E-books or listen to music on their travel, and if files of there programs are placed on the vehicles and can be accessed by users through a relay node, bandwidths of a backhaul network (especially Un air interfaces) can be saved and spectral efficiencies can be improved, furthermore, bandwidths on an access link can be used to provide users with rates fast enough to access multimedia resources (thus avoiding accessing through a Un interfaces which may be a bottle neck), thereby providing users with good service experiences. In addition, passengers on a same vehicle or plane also have a need for social networking and interaction, providing users with social networking applications or interactive game applications through a local network (e.g., a local area network in a vehicle) will lead to good user experiences.

Figure 4:
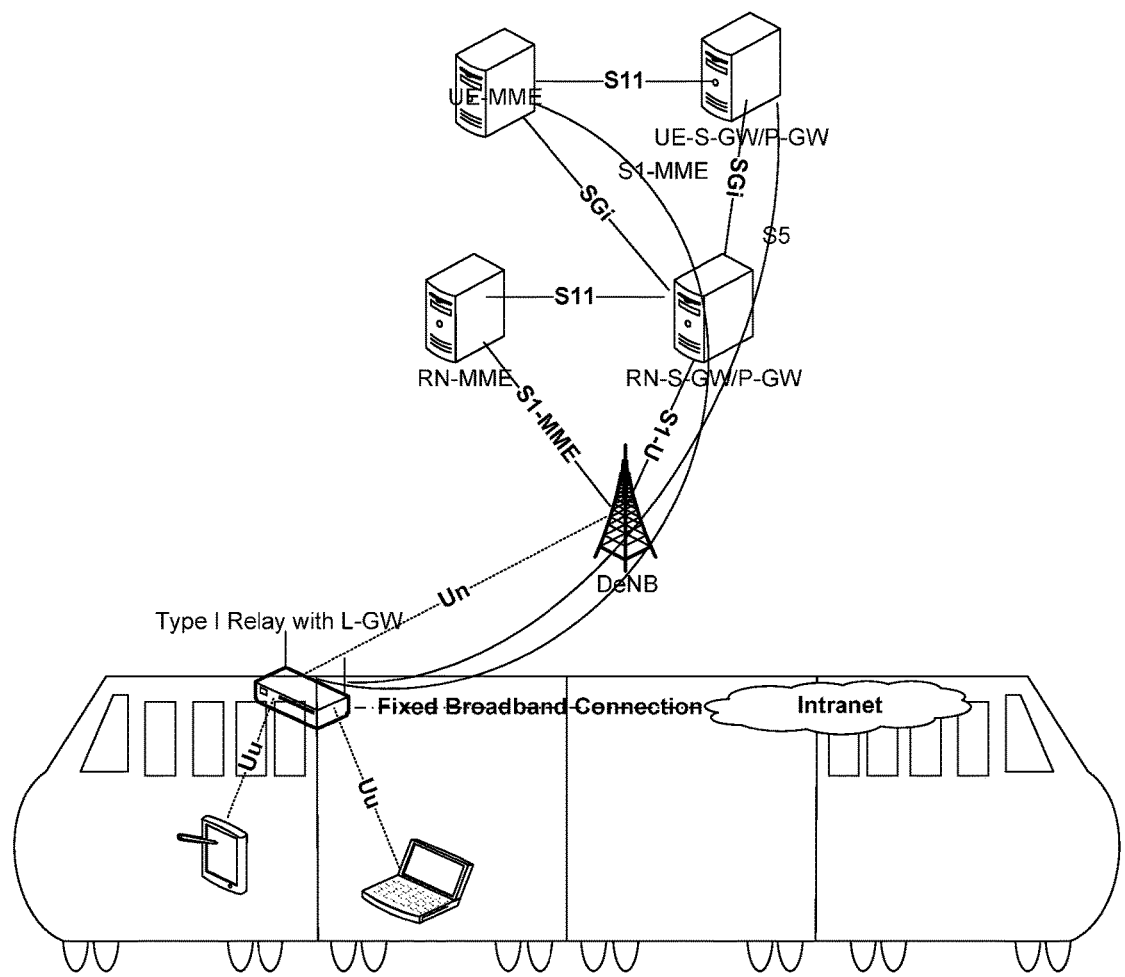
FIG. 4 is an architectural diagram of an extended type 1 of relay systems supporting a local IP service under a mobile relay scenario.

FIG. 4 is an architectural diagram of an extended Type 1 relay systems supporting a local IP service.

As shown in FIG. 4, one extended Type 1 relay node is deployed in a geographical region providing a local service or proximity-based service (e.g., on a train), preferably, the relay node is deployed on a vehicle, a Un interface is supported between the relay node and a Donor eNB (DeNB), and a Uu interface is supported between the relay node and an ordinary UE. An extended Type 1 relay node has an independent cell identifier, manages by itself a DRB between a serving UE and the relay node itself, and allocates resources for transmission between the relay node and an ordinary UE.

In the embodiment, in order to support a local IP service, a Local Gateway (L-GW) is embedded into the relay node, or the relay node is collocated with the local gateway, or the relay node is connected to the local gateway via a wired connection. A system using such an architecture supports a local PDN connection between a UE and a local gateway via a relay node.

The local gateway includes a local cache and/or a local server; or the local gateway is connected with at least one of the following network element and networks: a local server, a local area network and an Internet, so as to provide content/application services.

The local cache (and a local database, a local content providing device) can effectively reduce overhead of backhaul resources, for example, when a file is used by multiple UEs, backhaul resources are used only once by using a local cache rather than being used once when each UE downloads the file. A local gateway can cache locally during a low network load period to avoid a peak period of system loads and improve system efficiency. To this end, the local gateway and/or a relay node can trigger or stop local caching according to network load conditions, a content server of a core network can also push content to a relay node and/or a local gateway, and the pushing can be triggered or stopped according to network load conditions. A local gateway can cache locally while a relay node provides a local UE with relay services, specifically, after data arrive at a relay node from a DeNB, besides sending the data to the UE through a Uu interface between the relay node and the UE, the relay node copies the data for the local gateway as a local cache; or the data arrive firstly at the local gateway from a Packet Data Network Gateway (PDN-GW) of a core network (via a tunnel between the PDN and the LGW), then arrive at a UE served by the relay node from the local gateway (one implementation method is that a remote IP connection of a UE arrives at a local gateway from a PDN-GW of a core network then arrives at the UE, another implementation method is arriving at a UE via a local IP service connection between a local gateway and the UE), so as to reduce expense of backhaul resources and improve system efficiency. Local IP data streams arrive at a local cache, a local server, or a local area network via a UE, a relay node and a local gateway, or vice versa. A relay node is responsible for mapping between a DRB and a local PDN connection.

For a DeNB, a relay node is regarded as a UE, therefore there are also core network elements serving the relay node, including a Relay Node Mobility Management (RN-MME), a Relay node Serving Gateway (RN-S-GW), a Relay Node Packet Data Network Gateway (RN-P-GW), in the figure, the RN-P-GW and the RN-P-GW are drawn as a whole. There is an S1-MME interface between a DeNB and an RN-MME serving an RN, there is an S1-U interface between the DeNB and an RN-S-GW serving the RN, there is an S5/S8 interface between the RN-S-GW and an RN-P-GW serving the RN, and there is an S11 interface between the RN-MME and the RN-S-GW. An outward interface of the RN-P-GW is an SGi interface, through which the RN-P-GW can be connected to a UE-MME serving a UE, a UE-S-GW serving the UE and an Operation Administration Maintenance of an RN (RN-OAM). The SGi interface is an IP interface, it can carry S1-MME signaling data from a relay to a UE-MME, S1-U user data from the relay to a UE-S-GW, and S5 interface data from an LGW to the UE-S-GW. In other words, these data are transmitted through an EPS bearer of the relay (from the relay to RN-P-GW via DeNB and RN-S-GW).

When a local IP service is supported, a UE served by a relay has a local P-GW (i.e., an LGW, an S5/S8 interface between the LGW and the UE-S-GW is supported), instead of having a P-GW located in a core network. The UE served by the relay is connected to an LGW through the relay node, and further connected to a local server and a local area network. A local IP service can have multiple service modes:

1) a local server broadcasts or pushes to one or more UEs, through a local gateway/relay node, a product catalog, advertisement information, discount information, map/traveling information, weather information, traffic information, location information, live programs, or one or more UEs (e.g., a portable computer, a tablet computer) access, through a relay node/local gateway, multimedia resources on a local server such as a movie file, a music file and the like, or interactive applications between a UE and a relay node/ between a local gateway and a local server, for example navigation, tour guiding, mobile payment and the like.

2) at least two UEs establish a connection with a local server through a relay node/local gateway, and support through the local server social network applications between at least two UEs such as file sharing, chatting and/or games;

3) at least two UEs establish a direct connection with a local gateway through a relay node (the local gateway implements a local routing, also referred to as local switch or local forwarding), and support social network applications between at least two UEs or within-group communication applications such as file sharing, chatting, games and the like (interactions between two UEs use a point-to-point mode while interactions between multiple UEs can use a multicast mode);

A proximity-based service or a device-to-device communication service refers to a service performing IP service transmission between two or more short-distance devices, however, if the transmission is directly performed between two or more UEs (referred to as a direct communication mode, generally, user data are transmitted directly between UEs and the control plane still passes through a base station and an MME), it may be difficult for the system to monitor and manage services between two UEs, and the communication range of the direct communication between two UEs may become small due to factors such as its small transmission power, small antenna gain and low antenna height (obscured easily by obstacles). Therefore, a better mode is to use a local IP service mode so as to facilitate an operator to monitor and manage (a relay node, a local gateway and even a local server are monitored and managed by an operator), and the communication through a relay node supports larger communication range (accordingly more users can use proximity-based services) since the relay node has a larger transmission power, a larger antenna gain and a higher antenna height. In this way, not only a local service or proximity-based service between a relay node and a UE can be supported, but also a local service or proximity-based service implemented by two or more UEs through a relay node can be supported. Preferably, switching can be made between a direct communication mode and a local IP service mode under the control of a core network MME and a base station, and an operator can determine whether a direct communication mode or a local IP service mode is used according to factors such as service type, UE identification, service region, network load and need for monitoring (e.g., a lawful interception).

When a non-local IP service is supported, a P-GW serving a UE (i.e., UE-P-GW) is located in a core network. Then UE data arrive at the UE-P-GW through the RN, DeNB, RN-S-GW, RN-P-GW, UE-S-GW. The system can support local IP service connections and remote IP service connections of different UEs, it can also support simultaneous IP data connections between a UE and multiple gateways, including a local IP connection and a remote IP service connection, it can also support a switching between two IP service connections of a same UE, and it can also support simultaneous implementation of two IP service connections by a same UE.

Figure 11:
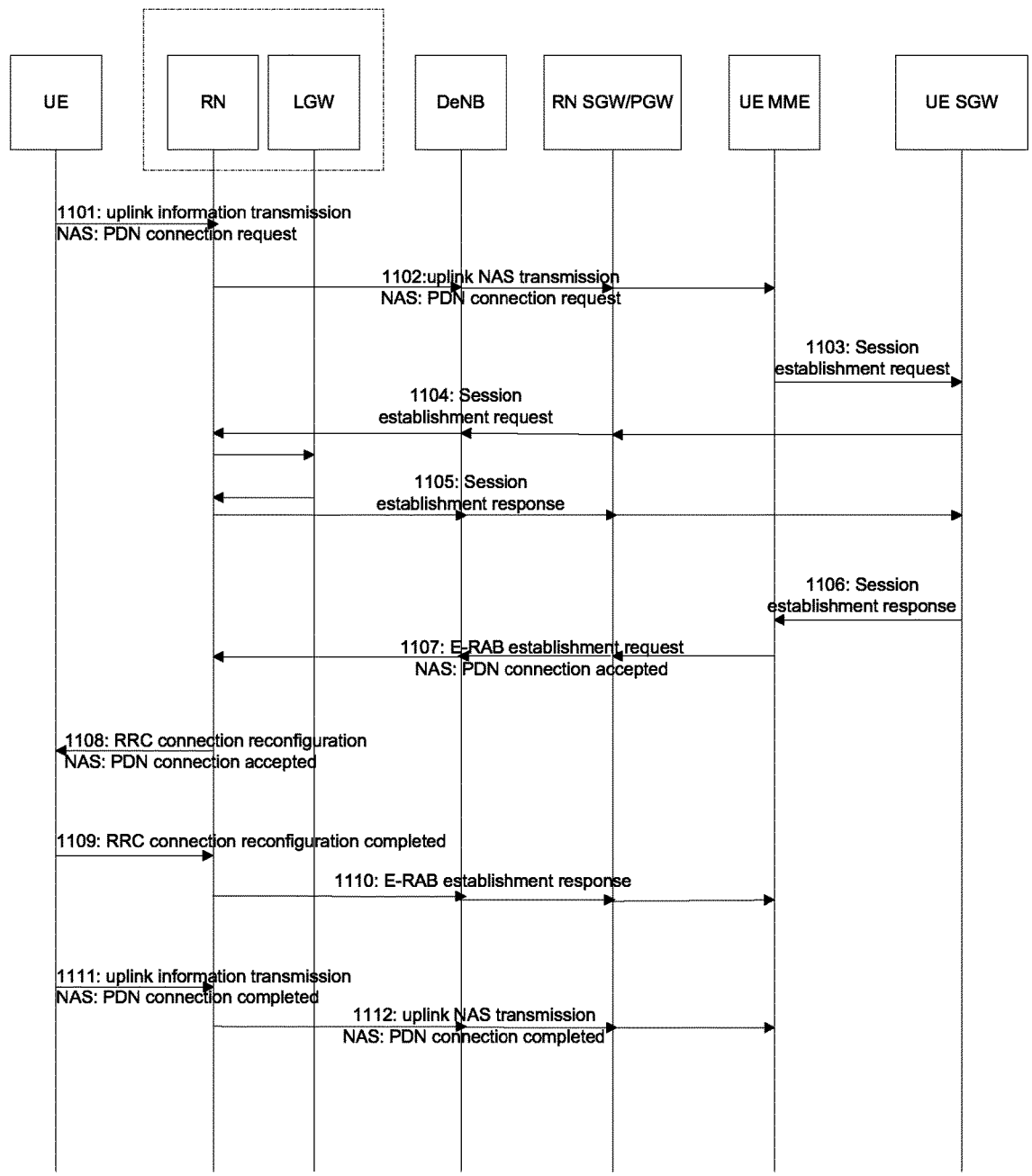
FIG. 11 is a flow chart for establishing a PDN connection of a local IP service in an architecture using an extended Type 1 relay systems supporting a local IP service.

FIG. 11 is a flow chart for establishing a PDN connection of a local IP service in an architecture using an extended Type 1 relay systems supporting a local IP service. In this flow, in order to support a local IP service, a L-GW is embedded into the relay node, or the relay node is collocated with the local gateway, or the relay node is connected to the local gateway via a wired connection. In this flow, an S-GW and P-GW serving an RN (i.e., RN-S-GW, RN-P-GW) are located in a core network. This flow also applies to another system architecture introduced in embodiment 3, a DeNB integrates an RN-S-GW, an RN-P-GW and S1/X2 proxy function serving a UE. The flow as shown in FIG. 11 includes the following steps:

Step 1101, a UE initiates a process for establishing an LIPA PDN connection through sending an uplink information transmission message to an RN, the uplink information transmission message carries NAS information and a PDN connection request, and the PDN connection request includes APN of an LIPA service requested by the UE.

Step 1102, after receiving the uplink information transmission message, the RN packets the NAS information thereof (the PDN connection request) into an uplink NAS transmission message of an S1 interface, and includes in the uplink NAS transmission message IP addresses of an LGW embedded therein, collocated therewith or connected therewith, and transmits the uplink NAS transmission message to a DeNB through a DRB of the RN, and the DeNB transmits the uplink NAS transmission message to an SGW and PGW serving the RN through a user plane GTP tunnel, and then the uplink NAS transmission message is routed to an MME serving a UE.

Step 1103, the MME serving the UE parses from received S1 message the PDN connection request, and determines according to the APN carried therein that it is an LIPA connection which the UE requests to establish, thus it is desired to implement LIPA access control. If the APN requested by the UE is already authorized to perform the LIPA access (a value of an LIPA permission is LIPA-only or LIPA-conditional), the MME performs access control on the connection according to CSG subscription data in user subscription data of the UE. If the LIPA access control in this flow succeeds, the MME transmits a session establishment message of an S11 interface to the SGW serving the UE so as to establish an EPS bearer. The MME is desired to select an appropriate LGW for the LIPA PDN connect according to an address of the LGW included in the NAS message received from the RN, and includes the address of the LGW in the session establishment request message of the S11 interface to indicate to the SGW.

Step 1104, the SGW serving the UE transmits a session establishment request message of an S5 interface to a corresponding LGW according to the address of the LGW included in received session establishment request message of the S11 interface. The message of the S11 interface is transmitted firstly to the RN PGW and RN SGW and then transmitted to the DeNB via the EPS bearer of the RN, the DeNB transmits the message of the S11 interface to the RN through an air RN DRB, then the message arrives at the LGW.

Step 1105, the LGW allocates a GTP TEID (in the case that the S5 user plane uses GTP protocol) or a GRE key (in the case that the S5 user plane uses PMIP protocol) to an S5 data plane of the LIPA PDN connection, and transmits to the SGW a session establishment response message of the S5 interface, in which allocated S5 GTP TEID or GRE key is included. Similarly, the session establishment response message of the S5 interface arrives at the UE SGW via the RN, DeNB, RN SGW and RN PGW.

Step 1106, the UE SGW transmits to the UE MME a session establishment response message of the S11 interface, in which the S5 GTP TEID or GRE key allocated by the LGW is carried.

Step 1107, the UE MME transmits to the RN an E-RAB establishment request message of the S1 interface, in which the S5 GTP TEID or GRE key allocated by the LGW is carried by taking E-RAB as granularity. A PDN connection acception message is also included in the message. Similarly, the E-RAB establishment request message of the S1 interface also arrives at the RN via the RN PGW, RN SGW and DeNB.

Step 1108, the RN parses the PDN connection acception message from received E-RAB establishment request message of the S1 interface, and packets this message into an RRC connection reconfiguration message and transmits it to a UE, and configures the UE with air interface DRB.

Step 1109, after being configured with the air interface DRB according to the RRC message, the UE transmits to the RN a RRC connection reconfiguration completion message.

Step 1110, the RN transmits to the UE MME an E-RAB establishment response message of the S1 interface, the message is transmitted to the UE via the DeNB, RN SGW and RN PGW.

Step 1111, the UE transmits to the RN the uplink information transmission message, in which a PDN connection completion message is included.

Step 1112, the RN transmits to the UE MME an uplink NAS transmission message of the S1 interface, the message is transmitted to the UE MME via the DeNB, RN SGW and RN PGW and has the PDN connection completion message carried therewith.

The LIPA PDN connection of the LIPA service is so far completely established, and the connection has two data channels. When a user is in a connection status, a direct tunnel between an RN and an LGW can be used for LIPA data transmission; when the user is in idle status, the direct tunnel between the RN and the LGW will be released, then a core network tunnel is enabled for paging. The RN can identify through received correlation identifiers (the S5 GTP TEID or GRE key allocated by the LGW) which E-RABs are transmitted through the direct tunnel (no need to be transmitted through a core network side tunnel), and establishes a mapping relation between the E-RAB in the RN of the direct tunnel and the EPS bearer in the L-GW.

Figure 5:
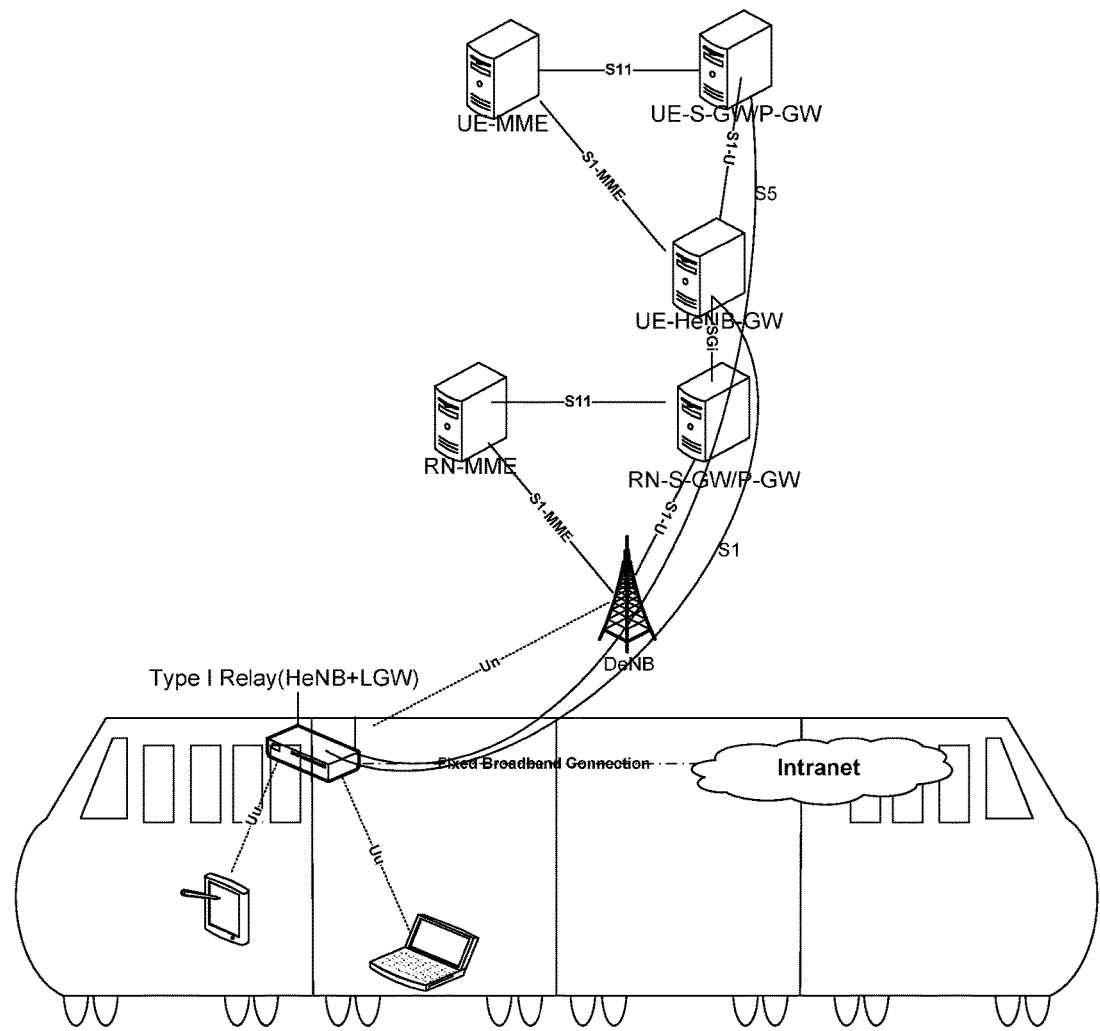
FIG. 5 is another architectural diagram of an extended Type 1 relay systems supporting a local IP service used in a mobile relay scenario.

FIG. 5 shows another relay architecture supporting a local IP service, which is another variation of the above architecture, and the main differences between this architecture and the architecture in FIG. 4 lie in: the relay includes an HeNB function (when communicating with a UE served by the relay) and a UE function (when communicating with a DeNB), an SGi interface coming from the RN-P-GW is connected to a UE-HeNB-GW, S1 interface data between the HeNB function of the relay and the UE-HeNB-GW are transmitted through an EPS bearer of the relay, UE-HeNB-GW functions as an proxy of the S1, i.e., proxying between an S1-MME interface between the HeNB function of the relay and the UE-HeNB-GW and an S1-MME interface between the UE-HeNB-GW and the UE-MME, and also supporting the proxy between an S1-U interface between the HeNB function of the relay and the UE-HeNB-GW and an S1-U interface between the UE-HeNB-GW and the UE-S=GW.

Figure 6:
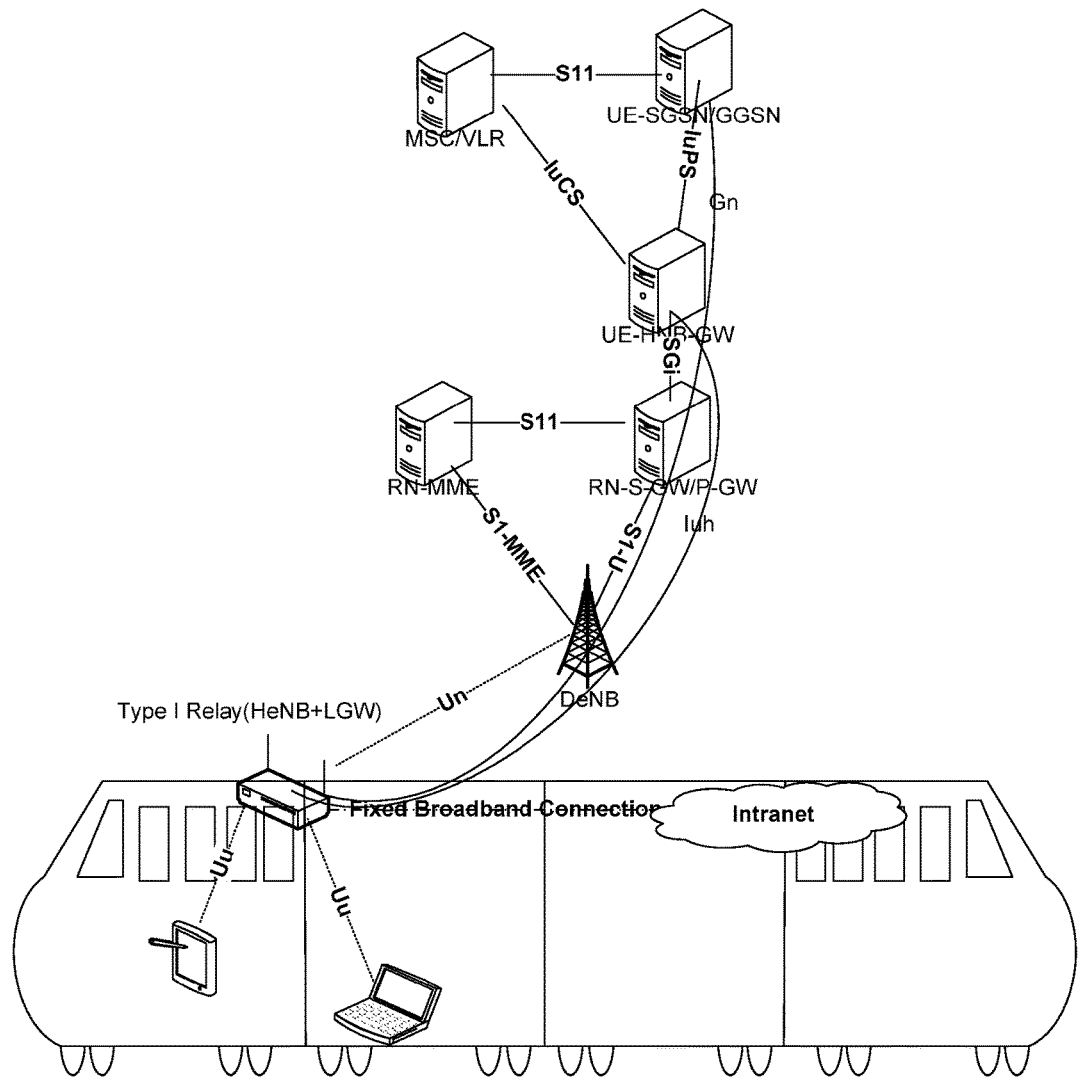
FIG. 6 is an architectural diagram of an extended Type 1 relay systems supporting a local IP service of a UMTS UE used in a mobile relay scenario.

Similar architectures can be used in an UE supporting different models (the supporting is referred to as multiple Radio Access Technology (multi-RAT)), FIG. 6 shows a relay architecture supporting a local IP service of a UMTS UE (3G UE), differences between this architecture and the architecture in FIG. 5 lie in: the relay includes an HNB function of the UMTS (when communicating with a UMTS UE served by the relay) and an LTE UE function (when communicating with an LTE DeNB), an SGi interface coming from the RN-P-GW is connected to a UE-HNB-GW, and Iuh interface data between the HNB function of the relay and the UE-HNB-GW are transmitted through an EPS bear of the relay. There is an IuCS interface (for supporting a voice service) between the UE-HNB-GW and a 3G core network, and there is an IuPS interface (for supporting a packet data service) between the UE-HNB-GW and an SGSN of the 3G core network. In order to support a local IP service, the HNB function of the relay further supports a LIPA function (the HNB is embedded into an LGW, collocated with the LGW or connected to the LGW), an Gn interface is supported between the LGW and the SGSN of the 3G core network, and the data transmission of this interface is through an EPS bearer of the relay. When a non-local IP service is supported, a GGSN serving UEs in a carriage is located in a core network (then it is a remote IP service).

The system can support local IP service connections and remote IP service connections of different UEs, it can also support simultaneous IP data connections between a UE and multiple gateways, including a local IP connection and a remote IP service connection, it can also support a switching between two IP service connections of a same UE, and it can also support simultaneous implementation of two IP service connections by a same UE.

Architectures similar to those of FIG. 5 and FIG. 6 can further be used in terminals supporting CDMA-2000, then the H(e)NB function integrated in a relay is replaced by a Femto Access Point (FAP) function in a CDMA-2000 system, and the H(e)NB-GW is replaced by an Femto-GW. In addition, corresponding core network elements and interfaces of a CDMA-2000 system are used (a Mobile Switching Center (MSC), Media Gateway (MGW) and Packet Data Service Node (PDSN)). Detailed description thereof will be omitted.

Embodiment 3

In locations such as enterprises, homes or entertainment venues, if it is difficult to deploy a wired backhaul or due to other reasons (such as cost), an operator may choose to deploy a fixed relay, however, users of the relay in these locations also needs for a local service, for example, accessing a local area network to visit applications such as multimedia data (musics, movies, videos and E-books), games and social networks, and the use of the local service can provide good user experiences, and can save bandwidths of a backhaul network (especially a Un interface) and provide higher access rates (avoiding passing through a Un interface which may become a bottle neck). Besides supporting a local IP service, the architecture according to the present disclosure will not affect the support of a remote IP service. System architectures, when the architecture according to the present disclosure supports a local IP service, a remote IP service and simultaneously supports both services, will be elaborated below with reference to FIG. 7, FIG. 8 and FIG. 9.

Figure 7:
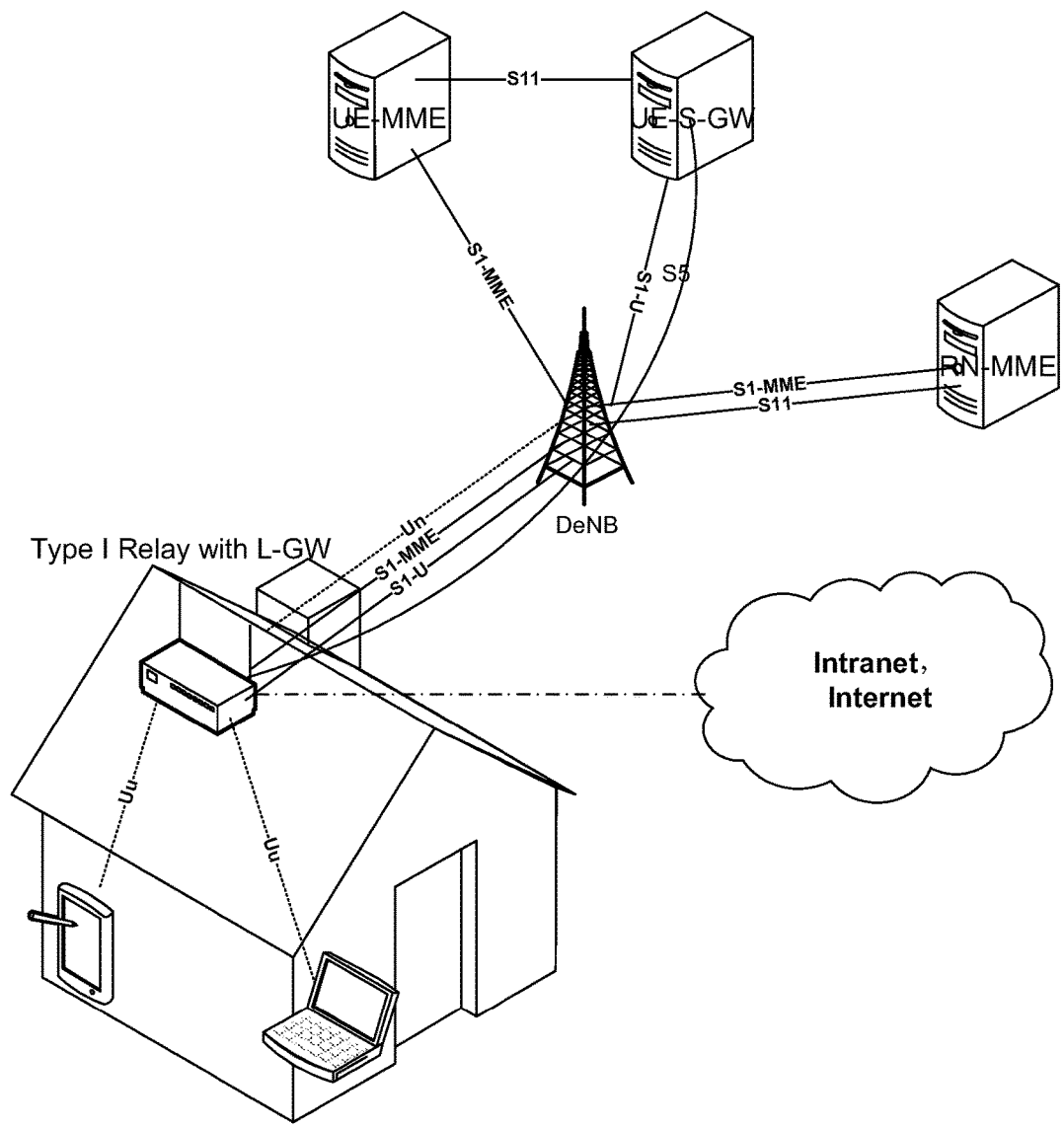
FIG. 7 is an architectural diagram when an extended Type 1 relay systems supporting a local IP service used in a fixed relay scenario supports a local IP service.

FIG. 7 is an architectural diagram when an extended Type 1 relay system supporting a local IP service supports a local IP service.

As shown in FIG. 7, an extended Type 1 relay node is deployed in a geographical region (e.g. in a room) providing a local service or a proximity-based service, a Un interface is supported between the relay node and a Donor eNodeB (DeNB), and a Uu interface is supported between the relay node and ordinary UEs. An extended Type 1 relay node has an independent cell identifier, manages by itself a DRB between a served UE and the relay node itself, and allocates resources for transmission between the relay node and an ordinary UE. In the embodiment, in order to support a local IP service, a L-GW is embedded into the relay node, or the relay node is collocated with the local gateway, or the relay node is connected to the local gateway via a wired connection. A system using such an architecture supports a local PDN connection between a UE and a local gateway via a relay node.

The local gateway includes a local cache and/or a local server; or the local gateway is connected with at least one of network elements and networks such as a local server, a local area network and an Internet so as to provide content/ application services.

The local cache (and a local database, a local content providing device) can effectively reduce overhead of backhaul resources, for example, when a file is used by multiple UEs, backhaul resources are used only once by using a local cache rather than being used once when each UE downloads the file. A local gateway can cache locally during a low network load period to avoid a peak period of system loads and improve system efficiency. To this end, the local gateway and/or a relay node can trigger or stop a local cache according to network load conditions, a content server of a core network can also push content to a relay node and/or a local gateway, and the pushing can be triggered or stopped according to network load conditions. A local gateway can cache locally while a relay node provides a local UE with relay services, specifically, after data arrive at a relay node from a DeNB, besides sending the data to the UE through a Uu interface between the relay node and the UE, the relay node copies the data for the local gateway as a local cache; or the data arrive firstly at the local gateway from a Packet Data Network Gateway (PDN-GW) of a core network (via a tunnel between the PDN and the LGW), then arrive at a UE served by the relay node from the local gateway (one implementation method is that a remote IP connection of a UE arrives at a local gateway from a PDN-GW of a core network then arrives at the UE, another implementation method is arriving at a UE via a local IP service connection between a local gateway and the UE), so as to reduce expense of backhaul resources and improve system efficiency. Local IP data streams arrive at a local cache, a local server, or a local area network via a UE, a relay node and a local gateway, or vice versa. A relay node is responsible for mapping between a DRB and a local PDN connection.

There are obvious differences between the architecture in the embodiment and the architecture in embodiment, in embodiment 2 the S-GW, P-GW serving the relay (i.e., RN-S-GW, RN-P-GW) are located in a core network, while in the embodiment, the DeNB integrates functions of the RN-S-GW, the RN-P-GW and an S1/X2 proxy serving a UE, therefore not only an S1-MME interface but also an S11 interface (actually the interface between the RN-S-GW and the RN-MME integrated by the the DeNB) are supported between the DeNB and the RN-MME.

An S1-MME interface is supported between an relay node and an MME of a core network, a DeNB implements proxy functions for the interface, functions of the interface include controlling a PDN connection between a UE and a relay node passing through an LGW (including authorization, establishment, modification and release of the connection) and supporting paging the UE. An S1-U between the relay node and a serving gateway (UE-S-GW) is proxied through a DeNB. An S11 interface is supported between an MME and a an S-GW, a function of the interface includes managing a session between a UE and a local gateway passing through a relay node (including establishment, modification and release of the session) and supports caching of UE data. An S5 interface is supported between a serving gateway and a local gateway, a function of the interface includes managing a session between a UE and a local gateway passing through a relay node (including establishment, modification and release of the session). S5 interface signalings and data are transmitted through a DeNB (in face they are connected with the UE-S-GW through an SGi interface of the RN-P-GW integrated by the DeNB).

A local IP service can have multiple service modes:

1) a local server broadcasts or pushes to one or more UEs, through a local gateway/relay node, a product catalog, advertisement information, discount information, map/traveling information, weather information, traffic information, location information, live programs, or one or more UEs (e.g., a portable computer, a tablet computer) access, through a relay node/local gateway, multimedia resources on a local server such as a movie file, a music file and the like, or interactive applications between a UE and a relay node/between a local gateway and a local server, for example navigation, tour guiding, mobile payment and the like.

2) at least two UEs establish a connection with a local server through a relay node/local gateway, and support through the local server social network applications between at least two UEs such as file sharing, chatting and games;

3) at least two UEs establish a direct connection with a local gateway through a relay node (the local gateway implements a local routing, also referred to as local switch or local forwarding), and support social network applications between at least two UEs or within-group communication applications such as file sharing, chatting, games and the like (interactions between two UEs use a point-to-point mode while interactions between multiple UEs can use a multicast mode);

A proximity-based service or a device-to-device communication service refers to a service performing IP service transmission between two or more short-distance devices, however, if the transmission is directly performed between two or more UEs (referred to as a direct communication mode, generally, user data are transmitted directly between UEs and the control plane still passes through a base station and an MME), it may be difficult for the system to monitor and manage services between two UEs, and the communication range of the direct communication between two UEs may become small due to factors such as its small transmission power, small antenna gain and low antenna height (obscured easily by obstacles). Therefore, a better mode is to use a local IP service mode so as to facilitate an operator to monitor and manage (a relay node, a local gateway and even a local server are monitored and managed by an operator), and the communication through a relay node supports larger communication range (accordingly more users can use proximity-based services) since the relay node has a larger transmission power, a larger antenna gain and a higher antenna height. In this way, not only a local service or proximity-based service between a relay node and a UE can be supported, but also a local service or proximity-based service implemented by two or more UEs through a relay node can be supported. Preferably, switching can be made between a direct communication mode and a local IP service mode under the control of a core network MME and a base station, and an operator can determine whether a direct communication mode or a local IP service mode is used according to factors such as service type, UE identification, service region, network load and need for monitoring (e.g., a lawful interception).

Figure 8:
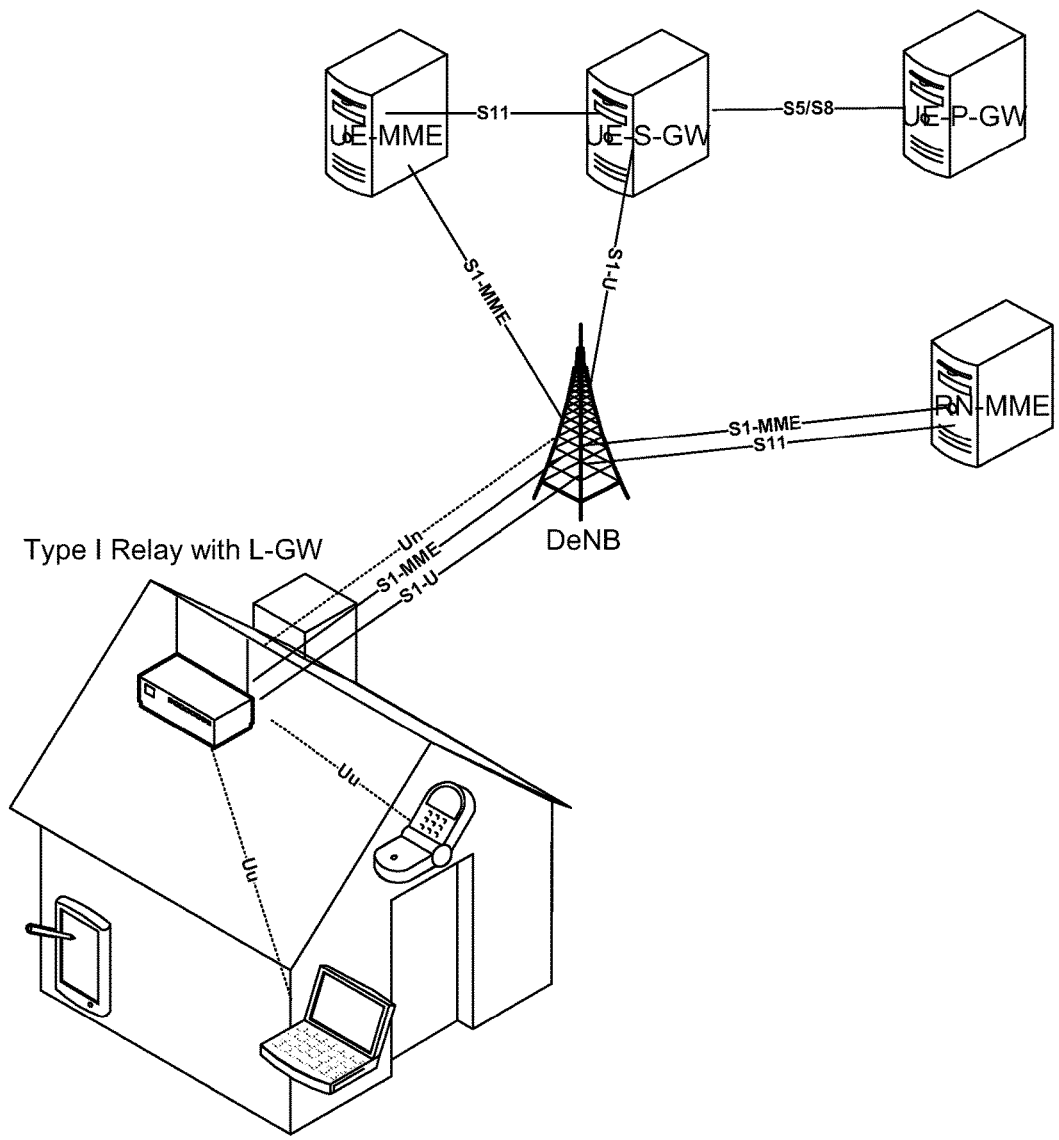
FIG. 8 is an architectural diagram when an extended Type 1 relay systems supporting a local IP service used in a fixed relay scenario supports a non-local IP service.

FIG. 8 is an architectural diagram when an extended Type 1 relay system supporting a local IP service supports a non-local IP service.

As shown in FIG. 8, an extended Type 1 relay node is deployed in a geographical region (e.g. in a room) providing a local service or a proximity-based service, a Un interface is supported between the relay node and a Donor eNodeB (DeNB), and a Uu interface is supported between the relay node and ordinary UEs. An extended Type 1 relay node has an independent cell identifier, manages by itself a DRB between a served UE and the relay node itself, and allocates resources for transmission between the relay node and an ordinary UE. A PDN connection between a UE and a UE-P-GW of a core network passes through a relay node, DeNB and UE-S-GW, and it can be referred to as a remote PDN connection.

There are obvious differences between the architecture in the embodiment and the architecture in embodiment, in embodiment 2 the S-GW, P-GW serving the relay (i.e., RN-S-GW, RN-P-GW) are located in a core network, while in the embodiment, the DeNB integrates functions of the RN-S-GW, the RN-P-GW and an S1/X2 proxy serving a UE, therefore not only an S1-MME interface but also an S11 interface (actually the interface between the RN-S-GW and the RN-MME integrated by the the DeNB) are supported between the DeNB and the RN-MME.

An S1-MME interface is supported between an relay node and an MME of a core network, a DeNB implements proxy functions for the interface, functions of the interface include controlling a PDN connection between a UE and a relay node passing through an LGW (including authorization, establishment, modification and release of the connection) and supporting paging the UE. An S1-U interface between the relay node and a serving gateway (UE-S-GW) is proxied through a DeNB. An S11 interface is supported between a UE-MME and a UE-S-GW, a function of the interface includes managing a session between a UE and a local gateway passing through a relay node (including establishment, modification and release of the session) and supports caching of UE data. An S5 or S8 interface is supported between the UE-S-GW and a PDN-GW of a core network, a function of the interface includes managing a session between a UE and the PDN-GW of the core network (including establishment, modification and release of the session).

Figure 9:
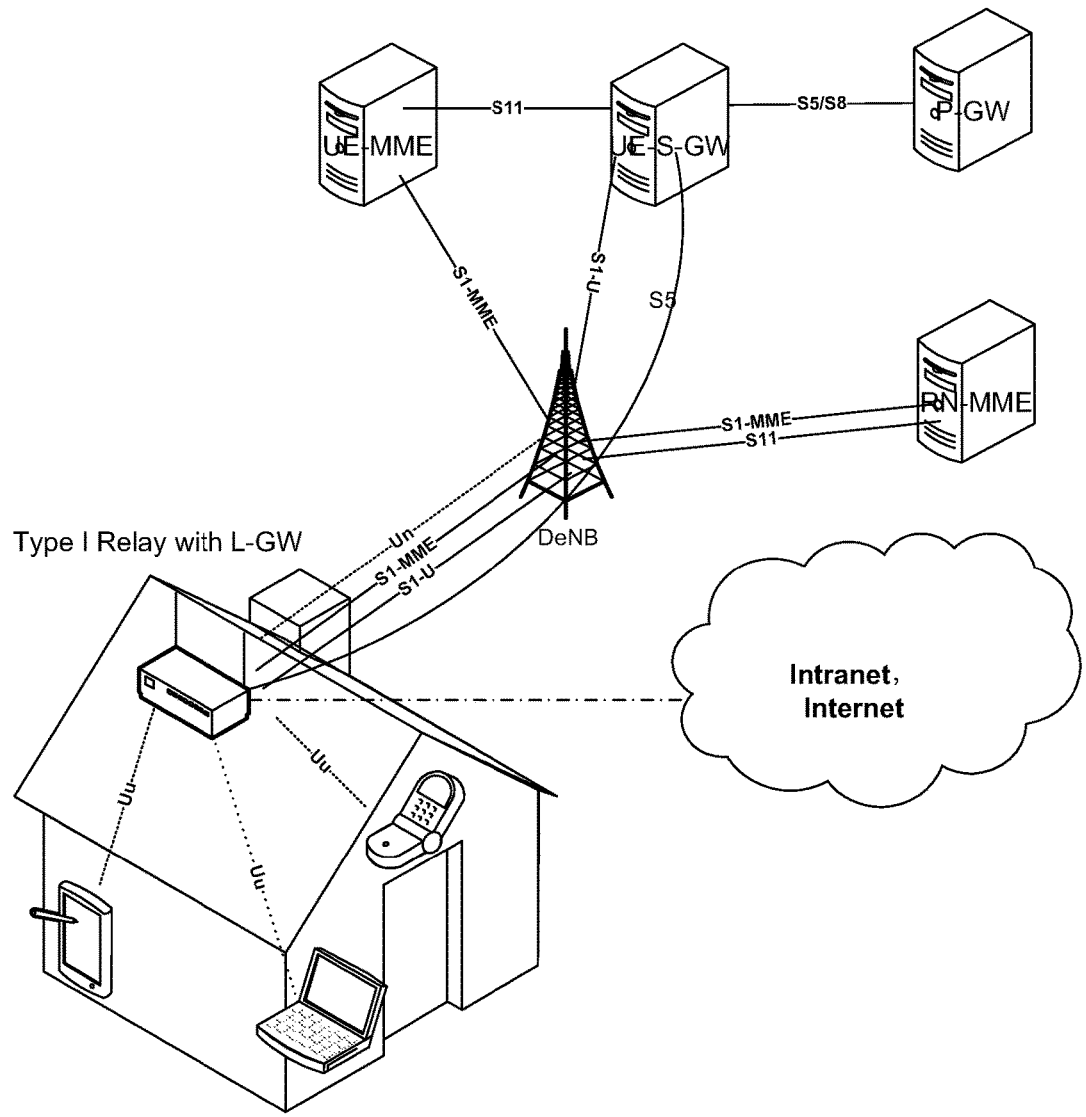
FIG. 9 is an architectural diagram when an extended Type 1 relay systems supporting a local IP service used in a fixed relay scenario supports simultaneously a local IP service and a non-local IP service.

FIG. 9 is an architectural diagram when a type 2 relay system supporting a local IP service supports simultaneously a local IP service and a non-local IP service. In this architecture, a system can support local IP service connections and remote IP service connections of different UEs, it can also support simultaneous IP data connections between a UE and multiple gateways, including a local IP connection and a remote IP service connection, it can also support a switching between two IP service connections of a same UE, and it can also support simultaneous implementation of two IP service connections by a same UE.

It should be noted that the architecture in embodiment two is described by taking a mobile relay scenario as an example, while the architecture in embodiment three is described by taking a fixed relay scenario as an example, in fact, both architectures can be used in fixed and mobile scenarios, and can support communications in emergent conditions (such as when disasters or accidents happen) or temporary communications (such as a big show). Furthermore, an RN-MME and UE-MME are logical MMEs serving a UE, in fact, they can be a same physical entity. In addition, relay nodes in the present disclosure may have different names in a practical system, and may also have different implementation modes (such as CPE+HNB mode), but they are a relay node if having below characteristics: there are data departing from a base station and arriving at a UE via the node or departing from a UE and arriving at a base station via the node.

Embodiment 4

Figure 10:
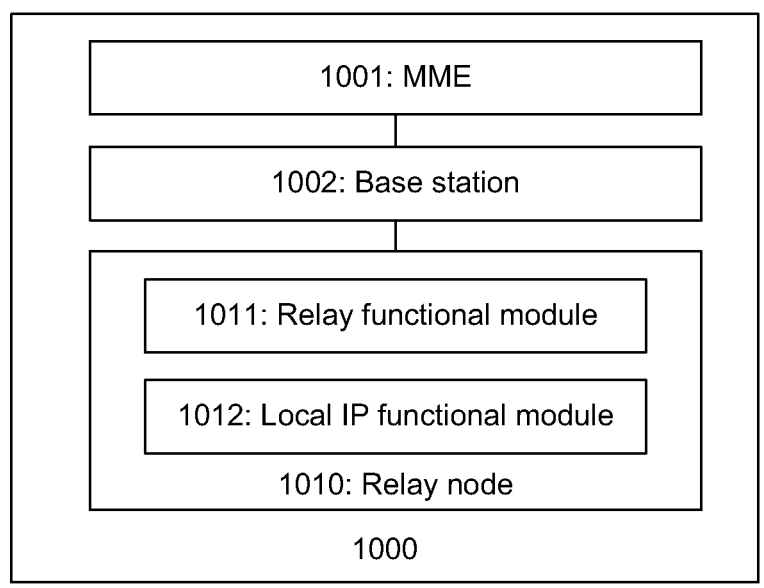
FIG. 10 is a schematic structural diagram of a system supporting local IP service functionality provided by an embodiment of the present disclosure.

FIG. 10 shows a system 1000 supporting a local IP service function provided by the present disclosure, and the system includes a core network and a relay node, wherein a Mobility Management Entity (MME) 1001 and a base station 1002 of the core network are used to manage and control the relay node 1010, and the relay node 1010 includes:

a relay functional module 1011 configured to provide a UE with data relay services;

a local IP functional module 1012 configured to provide a UE with local IP access functionality;

Preferably, for a UE, only the relay functional module provides the UE with data relay services, or only the local IP functional module provides the UE with local IP access functionality, or the the relay functional module and the local IP functional module simultaneously provide the UE with services.

Preferably, functions of the relay functional module and/or the local IP functional module are controlled by the MME and the base station of the core network.

Preferably, the system supports switching between a relay mode for providing relay services by the relay functional module and a local IP access mode for providing local IP access functionality by the local IP functional module.

Preferably, the local IP functional module is further configured to implement mutual switching between a local IP service mode based on the local gateway and an inter-UE direct communication mode under the control of the MME and the base station.

The system provided by the embodiment is implemented based on the method of aforementioned embodiments, therefore functions of network elements included in the system and functions of functional modules included in the network elements can be deducted or obtained directly from the aforementioned embodiments, and detailed descriptions thereof will be omitted.

What described are merely preferable embodiments of the present disclosure, and are not intended to limit the present disclosure.

The invention claimed is:

1. A method for implementing a local IP service through a relay node, comprising:
   establishing, through the relay node, a Packet Data Network (PDN) connection between a local User Equipment (UE) and a local gateway, and transmitting, through the relay node, local IP service data between the UE and the local gateway;
   the method further comprising:
   indicating, by a Donor eNodeB (DeNB), network load conditions to the relay node and/or the local gateway, caching locally, by the local gateway, the local IP service during a low network load period, or caching locally by the local gateway while the relay node provides the local UE with relay services;
   wherein the step of caching locally by the local gateway while the relay node provides the local UE with relay services comprises: after data arrive at the relay node from the DeNB, besides sending the data to the UE through a Uu interface between the relay node and the UE, copying, by the relay node, the data for the local gateway so as to be cached locally; or the data arriving firstly at the local gateway from a Packet Data Network Gateway (PDN-GW) of a core network, then arriving at a UE served by the relay node from the local gateway.

2. The method according to claim 1, wherein the local gateway is embedded into the relay node, or the local gateway is collocated with the relay node, or the local gateway is connected to the relay node via a wired connection.

3. The method according to claim 1, wherein the local gateway comprises a local cache and/or a local server; or the local gateway is connected with at least one of the following network element and networks: a local server, a local area network and an Internet.

4. The method according to claim 1, wherein the relay node comprises at least one of a type 1 relay node, type 1A relay node, type 1B relay node and type 2 relay node.

5. The method according to claim 1, wherein an S5 interface is supported between the local gateway and a Serving Gateway (S-GW) of a core network.

6. The method according to claim 5, wherein S5 interface data between the local gateway and the S-GW of the core network are transmitted through the relay node and the DeNB.

7. The method according to claim 1, further comprising:
   controlling, by a Mobility Management Entity (MME) of a core network, the establishment of the PDN connection between the UE and the local gateway.

8. The method according to claim 1, further comprising:
   establishing, through the relay node, a PDN connection between a UE and a Packet Data Network Gateway (PDN-GW) of a core network, and transmitting, through the relay node, remote IP service data between the UE and the PDN-GW of the core network.

9. The method according to claim 8, further comprising:
   controlling, by an MME of the core network and a base station, mutual switching between the following two modes: a PDN connection mode between the UE and the local gateway, and a PDN connection mode between the UE and the PDN-GW of the core network.

10. The method according to claim 8, further comprising:
    the UE being connected simultaneously with IP data PDN connections to a plurality of gateways, wherein the PDN connection between the UE and the local gateway and the PDN connection between the UE and the PDN-GW of the core network are included.

11. The method according to claim 1, further comprising:
    controlling, by an MME of the core network and a base station, mutual switching between a local IP service mode based on the local gateway and an inter-UE direct communication mode.

12. The method according to claim 1, further comprising:
    establishing, through the relay node, PDN connections between two or more local UEs and the local gateway; and
    establishing, between the two or more local UEs, end-to-end IP service streams through the local gateway.

13. A system supporting local IP service functionality, comprising a relay node, a base station and a Mobility Management Entity (MME), wherein
    the relay node is configured to provide a UE with data relay services;
    the relay node comprises a local gateway configured to provide a UE with local IP access functionality;
    the MME and the base station are configured to manage and control the relay node;
    the local gateway is configured to receive network load conditions indicated by a Donor eNodeB (DeNB), and cache locally the local IP service during a low network load period; or to cache locally the local IP service while the relay node provides the local UE with relay services; and
    the relay node is configured to receive data from the DeNB, sends the data to the UE through a Uu interface between the relay node and the U E, and copy the data for the local gateway so as to be cached locally; and the local gateway is further configured to receive the data from a Packet Data Network Gateway (PDN-GW) of a core network, and send data to a UE by the relay node.

14. The system according to claim 13, wherein for a UE, the relay node is configured to provide the UE with data relay services, or the local gateway is configured to provide the UE with local IP access functionality, or the relay node and the local gateway are configured to provide the UE with services simultaneously.

15. The system according to claim 14, wherein the local gateway is further configured to implement mutual switching between a local IP service mode based on the local gateway and an inter-UE direct communication mode under the control of the MME and the base station.

16. The system according to claim 13, wherein a relay mode of relay services provided by the relay node and a local IP access mode of local IP access functionality provided by the local gateway are switched mutually therebetween.

17. The system according to claim 16, wherein the local gateway is further configured to implement mutual switching between a local IP service mode based on the local gateway and an inter-UE direct communication mode under the control of the MME and the base station.

18. The system according to claim 13, wherein the local gateway is further configured to implement mutual switching between a local IP service mode based on the local gateway and an inter-UE direct communication mode under the control of the MME and the base station.

* * * * *